(12) United States Patent
Kusche et al.

(10) Patent No.: US 7,992,905 B2
(45) Date of Patent: Aug. 9, 2011

(54) FORWARD STRUCTURE OF A MOTOR VEHICLE

(75) Inventors: Joerg Kusche, Oelbronn-Duerrn (DE);
Michael Soellner, Grafenau-Doeffingen (DE); Dimitar Danev, Renningen (DE);
Ferdinand Schwinger, Graz (AT)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 147 days.

(21) Appl. No.: 12/170,109

(22) Filed: Jul. 9, 2008

(65) Prior Publication Data

US 2009/0045637 A1    Feb. 19, 2009

(30) Foreign Application Priority Data

Jul. 10, 2007    (DE) .................... 10 2007 032 031

(51) Int. Cl.
*B60R 19/34* (2006.01)
(52) U.S. Cl. ................ 293/133; 293/120; 296/187.04
(58) Field of Classification Search .................. 293/108, 293/109, 120, 121, 122, 130, 132, 133, 136, 293/152; 296/187.03, 187.04, 187.06, 187.09, 296/187.11
See application file for complete search history.

(56) References Cited

U.S. PATENT DOCUMENTS

| | | | | |
|---|---|---|---|---|
| 3,871,636 A | * | 3/1975 | Boyle | 267/140 |
| 4,072,334 A | * | 2/1978 | Seegmiller et al. | 293/110 |
| 4,756,948 A | | 7/1988 | Kuramochi et al. | |
| 5,265,925 A | * | 11/1993 | Cox et al. | 293/120 |
| 5,672,405 A | * | 9/1997 | Plank et al. | 428/133 |
| 5,810,406 A | * | 9/1998 | Reid et al. | 293/128 |
| 6,186,565 B1 | * | 2/2001 | Unrath | 293/133 |
| 6,755,452 B2 | * | 6/2004 | Cate et al. | 293/120 |
| 7,204,531 B2 | * | 4/2007 | Kim | 293/120 |
| 7,404,593 B2 | * | 7/2008 | Cormier et al. | 296/187.03 |
| 2002/0121787 A1 | * | 9/2002 | Tarahomi et al. | 293/120 |
| 2003/0111852 A1 | * | 6/2003 | Carley et al. | 293/109 |
| 2003/0132640 A1 | | 7/2003 | Weissenborn et al. | |
| 2003/0141728 A1 | * | 7/2003 | Arvelo et al. | 293/133 |
| 2004/0174025 A1 | * | 9/2004 | Converse et al. | 293/133 |
| 2004/0217605 A1 | | 11/2004 | Banry et al. | |
| 2006/0145490 A1 | * | 7/2006 | Yamaguchi et al. | 293/109 |
| 2007/0069535 A1 | * | 3/2007 | Mohapatra et al. | 293/121 |
| 2009/0206618 A1 | * | 8/2009 | Ralston et al. | 293/120 |

FOREIGN PATENT DOCUMENTS

| | | | |
|---|---|---|---|
| DE | 102-34-038 | * | 8/1994 |
| DE | 19648804 | | 5/1998 |
| DE | 102 34 038 A1 | | 6/2003 |
| EP | 1103428 | | 5/2001 |

* cited by examiner

*Primary Examiner* — Glenn Dayoan
*Assistant Examiner* — Pinel E Romain
(74) *Attorney, Agent, or Firm* — Gerald E. Hespos; Michael J. Porco

(57) ABSTRACT

A forward structure of a motor vehicle, particularly of a passenger car, includes a bumper cross member and an energy absorption element, particularly a foam-type impact absorbing element, disposed in front of the bumper cross member in the driving direction. A plurality of recesses are shaped into the forward-side outer contour of the energy absorption element. To ensure optimal energy reduction while the mounting space is reduced, and thereby a best-possible protective function with respect to a leg impact, at least several of the recesses completely penetrate the energy absorption element along its entire depth, whereby a plurality of breakthroughs are arranged in the energy absorption element.

13 Claims, 1 Drawing Sheet

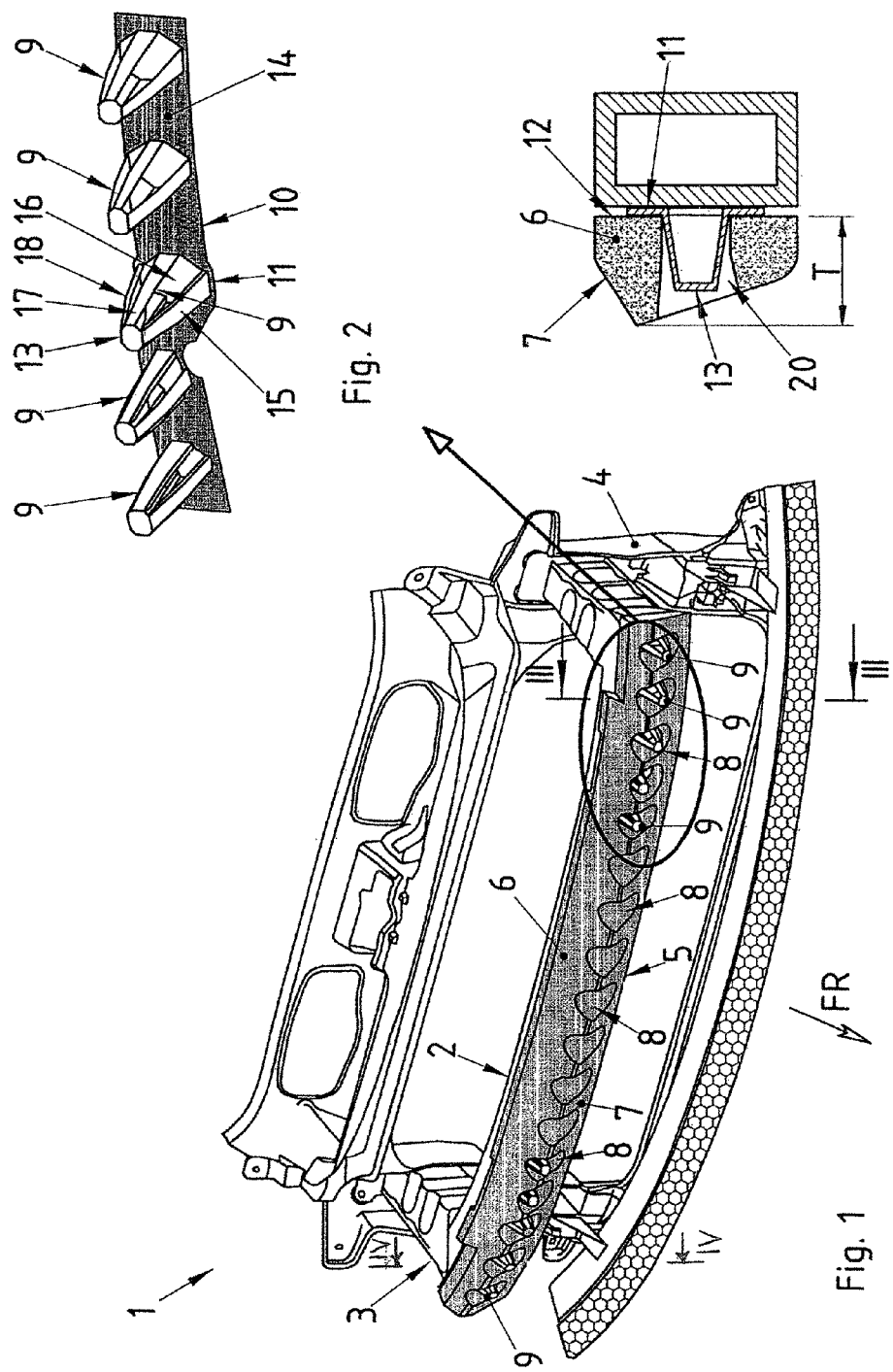

FORWARD STRUCTURE OF A MOTOR VEHICLE

CROSS REFERENCE TO RELATED APPLICATION

This application claims priority under 35 U.S.C. § 119 to German Application No. 10 2007 032 031.2, filed Jul. 10, 2007, the entire disclosure of which is expressly incorporated by reference herein.

BACKGROUND AND SUMMARY OF THE INVENTION

The invention relates to a forward structure of a motor vehicle, particularly of a passenger car.

From the series production of motor vehicles, it is known to dispose an energy absorbing element, particularly a foam-type impact absorbing element, in front of a bumper cross member assigned to the forward structure of the vehicle in order to absorb energy in the event of an impact.

From German Patent document DE 102 34 038 A1, a forward structure of a passenger car is known, which includes a bumper cross member in front of which—viewed in the driving direction—a part made of a foamed material is disposed. In order to pass the pendulum test and the lower leg test, German Patent document DE 102 34 038 A1 suggests that the foamed part, at least partially, has knobs or indentations. By means of this knob structure, foams or foamed materials with a higher specific gravity can be used. This reduces the penetration depths of the pendulum during the pendulum impact.

In the case of increasingly further reduced deformation spaces in the forward structure regions of the vehicle, under certain circumstances, the knobs or indentations may not be sufficient for implementing an optimal energy reduction.

It is therefore an object of the invention to improve the forward structure of a motor vehicle, particularly of a passenger car, such that, while the installation space is reduced, an optimal energy reduction and thereby the best-possible protective function for a leg impact is ensured.

According to the invention, a forward structure of a motor vehicle, particularly a passenger car, includes a bumper cross member, and an energy type impact absorbing element, disposed in front of the bumper cross member—viewed in the driving direction. A plurality of recesses are shaped into the forward-side outer contour of the energy absorption element. At least several of the recesses completely penetrate the energy absorption element along its entire depth, whereby a plurality of breakthroughs are arranged in the energy absorption element.

Advantageous embodiments of the invention are described herein.

The bumper cross member is connected to the supporting structure of the passenger car forward structure and is used for absorbing and transmitting impact forces into the supporting structure. Crash boxes, which are part of the supporting structure, are preferably arranged between the bumper cross member and the two forward side members.

As a rule, the energy absorption element ensures the energy reduction by compressing the foam material that is used. As much energy as possible should be reduced when an accident occurs with another vehicle, so that hard foam is used for this purpose. However, in the case of accidents with a pedestrian, large penetration depths should be made possible, so that the load values, such as the knee bending angles, the shearing values, and the acceleration values, can be minimized. A relatively soft foam is required for this purpose.

A plurality of recesses are shaped into the forward-side outer contour of the energy absorption element disposed in front of the bumper cross member, which recesses completely penetrate the energy absorption element along its entire depth. A plurality of hole-like recesses are therefore arranged in the energy absorption element. As a result, harder foams or materials can be used in order to permit the energy reduction required for the pendulum impact. Simultaneously, the material of the bridge regions surrounding the recess can be deflected into the recesses. As a result of the breakthroughs according to the invention, the residual block length of the energy absorption element can be further reduced.

In an advantageous further development of the invention, the recesses extend almost along the entire width of the energy absorption element. As a result, a relatively uniform energy reduction becomes possible over the entire forward structure. This effect is promoted when the recesses are situated at substantially the same level.

In order to compensate for the lack of initial stiffness of the energy absorption element, crash-box-like elements may extend, at least partially, into one of the breakthroughs respectively. Particularly with respect to an improved initial stiffness during the leg impact, this has a positive effect on the energy absorption. Simultaneously, the bridge regions between the recesses supply the softness of the energy absorption element desired for the pedestrian impact. When the foam depth is low, the crash-box-like elements cause an optimal utilization of the deformation path in order to compensate for the lack of initial stiffness of the foam part.

Manufacturing advantages are achieved when several of the crash-box-like elements are combined in an insert. The insert can therefore easily be placed, particularly inserted, from the rear into the breakthroughs of the energy absorption element and can be fastened together with the energy absorption element on the bumper cross members.

It was found that a truncated cross-section of the crash-box-like elements results in optimal energy absorption values, in which case the base of the truncated cone is oriented to the back side of the energy absorption element; that is, the narrower truncated cone head is oriented toward the outer contour of the energy absorption element.

Additional manufacturing advantages are achieved when the crash-box-like element has a truncated construction. It may then be manufactured, for example, as a deep-drawn part.

The residual block length can be further reduced when the side walls of the crash-box-like element are provided with cutouts, which result in wall webs. Depending on the demanded energy absorption values, a simple adaptation can take place by selecting the material type, the material thickness or by varying the number and the size of the cutouts. Desired bending points may be provided in the webs, at which bending points the component would fail first.

In a preferred embodiment of the invention, no crash-box-like elements which penetrate the breakthroughs may be provided in a defined region of the energy absorption element. In addition, breakthroughs can be completely eliminated in this defined region and instead recesses may be provided to a predefined depth.

Other objects, advantages and novel features of the present invention will become apparent from the following detailed description when considered in conjunction with the accompanying drawings.

BRIEF DESCRIPTION OF THE DRAWINGS

FIG. 1 is a perspective view of a forward module of a passenger car as seen diagonally from the front;

FIG. 2 is a detailed view of the insert according to FIG. 1; and

FIG. 3 is a sectional view according to line III-III in FIG. 1 and also is a sectional view according to line IV-IV in FIG. 1.

DETAILED DESCRIPTION OF THE DRAWINGS

FIG. 1 illustrates a forward module 1 having a bumper cross member 2. By way of crash boxes 3 and 4, the bumper cross member 2 is connected to the supporting structure of the passenger car. An energy absorption element 5 is disposed in front of the bumper cross member 2 in the driving direction FR. The energy absorption element 5 is a foam part 6 into whose forward-pointing outer contour 7 a plurality of recesses 8 are shaped. At least some of the recesses 8 penetrate the foam part 6 through its entire depth T, so that breakthroughs 20 are created (see FIG. 3).

While no crash-box-like elements are arranged in the passage holes 8 that are located in the central region of the foam part 6, crash-box-like elements 9 are arranged in the breakthroughs 20 on both sides of the central region.

As illustrated in the detailed view of FIG. 2, several of these crash-box-like elements 9 (here, five elements) are combined to form an insert 10. The crash-box-like elements 9 each have a truncated cross-section, which is illustrated particularly in the schematic representation of FIG. 3. The base 11 of the truncated cone is assigned to the rearward side 12 of the foam part 6, whereas the head 13 of the truncated cone is oriented toward the outer contour 7. The bases 11 of the crash-box-like elements 9 are mutually connected by a common plate 14. The energy absorption capacity of the crash-box-like elements 9 can be influenced by using cutouts 16 placed in the side wall 15, so that only webs 17 remain standing for the wall. Desired bending points 18 are provided in the webs 17 for a targeted deformation in the event of forces acting in the direction of the arrow F.

The mounting of the foam part 6 and the insert 10 can take place in a form-locking manner in that the diameter of the breakthroughs
on the rearward side 12 of the foam part 6 is slightly smaller than the diameter of the base 11 of the insert. Together, the foam part 6 and the insert 10 can then be fastened in a form-locking or force-locking manner to the cross member 2.

It is not contrary to the invention for the energy absorption element 5 itself not to be constructed as a foam part but, rather as a plastic part.

The foregoing disclosure has been set forth merely to illustrate one or more embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A forward structure of a motor vehicle, comprising:
a bumper cross member;
an energy absorption element disposed in front of the bumper cross member viewed in a driving direction, the energy absorption element having opposite left and right sides, a rear surface facing the bumper cross member and a forward side contour opposite the rear surface;
a plurality of recesses shaped into the forward side contour of the energy absorption element;
wherein the plurality of recesses include left and right groups of recesses in proximity to the respective left and right sides of the energy absorption element and a center group of recesses between the left and right groups of recesses, the recesses in the left and right groups of said recesses penetrate completely through a depth of the energy absorption element viewed in the driving direction to form breakthroughs arranged in the energy absorption element, the recesses in the center group of said recesses penetrate only partly through the depth of the energy absorption element viewed in the driving direction;
spaced apart crash-boxes, extending at least partially into at least one of the breakthroughs in the left group of recesses and at least partially into at least one of the breakthroughs in the right group of recesses wherein several of the crash-boxes are combined in a left insert, each of the crash-boxes of the left insert extending into a respective breakthrough in the left group of recesses, and wherein several of the crash-boxes are combined in a right insert, each of the crash-boxes of the right insert extending into a respective breakthrough in the right group of recesses.

2. The forward structure according to claim 1, wherein the recesses are spaced over almost an entire width of the energy absorption element.

3. The forward structure according to claim 1, wherein the recesses extend at an almost identical level over the entire width of the energy absorption element.

4. The forward structure according to claim 2, wherein the recesses extend at an almost identical level over the entire width of the energy absorption element.

5. The forward structure according to claim 1, wherein the crash-box has a truncated cross-section, a base of which is oriented toward the rearsurface of the energy absorption element, a plate extending out from the base of the truncated cross-section in a direction transverse to the driving direction, the base being disposed between the bumper cross member and the energy absorption element.

6. The forward structure according to claim 5, wherein the crash-box element has a cup shape.

7. A forward structure of a motor vehicle, comprising:
a bumper cross member;
an energy absorption element disposed in front of the bumper cross member viewed in a driving direction,
a plurality of recesses shaped into a forward side contour of the energy absorption element, at least several of said recesses penetrating completely through a depth of the energy absorption element viewed in the driving direction to form several breakthroughs arranged in the energy absorption element; and
a crash-box extending at least partially into one of the breakthroughs, the crash-box element having a cup-shaped defining a truncated cross-section, a base of which is oriented toward a rearward side of the energy absorption element, wherein side walls of the crash-box element are provided with cutouts, whereby webs are formed.

8. The forward structure according to claim 6, wherein side walls of the crash-box are provided with cutouts, whereby webs are formed.

9. The forward structure according to claim 7, wherein at least one web has a desired bending point.

10. The forward structure according to claim 8, wherein at least one web has a desired bending point.

11. The forward structure according to claim 7, wherein no crash-box penetrates a recess in a defined region of the energy absorption element.

12. The forward structure according to claim 11, wherein crash-boxes penetrate breakthroughs on both sides of the defined region.

13. An energy absorption element for a forward structure of a motor vehicle, which is disposed in front of a bumper cross member in a driving direction, the element having opposite left and right sides and comprising:
- a plurality of recesses spaced inwardly from the left and right sides of the element and shaped into a forward-side outer contour of a main body of the element; and
- a plurality of left breakthroughs formed in the energy absorption between the recesses and the left side of the energy absorption element and completely penetrating the main energy absorption element along an entire depth of the energy absorption element in the driving direction, and a plurality of right breakthroughs are formed in the energy absorption element between the recesses and the right side of the energy absorption element along the entire depth of the energy absorption element in the driving direction; and
- a left plate substantially adjacent the left side of the element at a portion between the element and the bumper cross-member, a plurality of spaced apart left crash-boxes extending forward from the left plate substantially adjacent the right side of the element and between the element and the bumper cross member, a plurality of spaced apart right crash-boxes extending forwardly from the right plate and into the respective right breakthroughs; wherein each of the crash-boxes defines a truncated cup shape having side walls formed with cutouts.

* * * * *